(12) United States Patent
Livne

(10) Patent No.: US 9,659,165 B2
(45) Date of Patent: May 23, 2017

(54) METHOD AND APPARATUS FOR ACCESSING CORPORATE DATA FROM A MOBILE DEVICE

(75) Inventor: Eran Livne, Tel Aviv (IL)

(73) Assignee: Crimson Corporation, Dover, DE (US)

(*) Notice: Subject to any disclaimer, the term of this patent is extended or adjusted under 35 U.S.C. 154(b) by 494 days.

(21) Appl. No.: 13/590,339

(22) Filed: Aug. 21, 2012

(65) Prior Publication Data

US 2013/0061307 A1   Mar. 7, 2013

(51) Int. Cl.
  G06F 21/20   (2006.01)
  G06F 21/44   (2013.01)
  G06F 21/33   (2013.01)
  H04W 12/06   (2009.01)
  H04W 12/08   (2009.01)

(52) U.S. Cl.
  CPC ............ G06F 21/44 (2013.01); G06F 21/335 (2013.01); H04W 12/06 (2013.01); H04W 12/08 (2013.01); G06F 2221/2103 (2013.01)

(58) Field of Classification Search
  CPC ........ G06F 21/44; G06F 21/33; H04W 12/06; H04W 12/08
  See application file for complete search history.

(56) References Cited

U.S. PATENT DOCUMENTS

| | | | |
|---|---|---|---|
| 6,067,623 A * | 5/2000 | Blakley et al. | 726/5 |
| 6,986,061 B1 | 1/2006 | Kunzinger | |
| 7,047,560 B2 * | 5/2006 | Fishman et al. | 726/6 |
| 7,136,645 B2 | 11/2006 | Hanson et al. | |
| 7,484,106 B2 * | 1/2009 | Rhoten | G06F 21/31 713/182 |
| 7,765,585 B2 * | 7/2010 | Chao et al. | 726/5 |
| 7,818,792 B2 * | 10/2010 | Shamsaasef et al. | 726/10 |
| 2002/0109718 A1 | 8/2002 | Mansour et al. | |
| 2002/0174194 A1 | 11/2002 | Mooney et al. | |
| 2005/0198158 A1 | 9/2005 | Fabre et al. | |
| 2006/0253548 A1 | 11/2006 | Vitanov et al. | |
| 2007/0100978 A1 | 5/2007 | Levi et al. | |
| 2007/0106739 A1 | 5/2007 | Clark et al. | |
| 2007/0248078 A1 | 10/2007 | Gundavelli et al. | |
| 2008/0072303 A1 * | 3/2008 | Syed | 726/10 |

(Continued)

FOREIGN PATENT DOCUMENTS

EP   1526428 A2   4/2005
WO   0182562 A2   11/2001

(Continued)

*Primary Examiner* — Brandon Hoffman
*Assistant Examiner* — Wasika Nipa

(57) ABSTRACT

A computer-implemented communication method performed by a computerized device and a computerized communication apparatus, the method comprising: receiving by a buffer server a first communication request and a device key from a mobile device; verifying the device key and a buffer server key; sending a request with details associated with the device key and the buffer server key, to a corporate server; receiving a response from the corporate server; removing data from the response, and sending a reduced response to the mobile device; receiving a user identification and a second communication request from the mobile device, for the data that has been removed; and sending the data that has been removed to the mobile device, upon verifying the user identification.

27 Claims, 7 Drawing Sheets

(56) References Cited

U.S. PATENT DOCUMENTS

| | | |
|---|---|---|
| 2008/0147787 A1 | 6/2008 | Wilkinson et al. |
| 2008/0263365 A1 | 10/2008 | Aupperle et al. |
| 2009/0103539 A1 | 4/2009 | Keeler et al. |
| 2009/0119504 A1 | 5/2009 | Van Os et al. |
| 2010/0100825 A1 | 4/2010 | Sharoni |
| 2010/0153866 A1 | 6/2010 | Sharoni |
| 2010/0228968 A1 | 9/2010 | Wason et al. |
| 2010/0281258 A1 | 11/2010 | Andress et al. |
| 2010/0304714 A1* | 12/2010 | Chao ............... G06Q 20/12 455/411 |

FOREIGN PATENT DOCUMENTS

| | | |
|---|---|---|
| WO | 03079619 A1 | 9/2003 |
| WO | 2004057834 A2 | 7/2004 |
| WO | 2007011735 A2 | 1/2007 |
| WO | 2008034090 A1 | 3/2008 |
| WO | 2009021200 A1 | 2/2009 |
| WO | 2010037201 A1 | 4/2010 |
| WO | 2010151860 A1 | 12/2010 |

* cited by examiner

METHOD AND APPARATUS FOR ACCESSING CORPORATE DATA FROM A MOBILE DEVICE

TECHNICAL FIELD

The present disclosure relates to mobile devices in general, and to a method and apparatus for securely accessing corporate data from mobile devices, in particular.

BACKGROUND

In recent decades, electronic technology, including communication technology, has revolutionized our everyday lives. Electronic devices such as PDAs, mobile phones, mobile media players, and digital cameras, or the like, have permeated the lives of almost every person living in the developed world, and quite a number of people living in undeveloped countries. Mobile communication and computing devices, especially, have become the means by which countless millions conduct their personal and professional interactions with the world. It has become almost impossible for many people, especially those in the business world, who use these devices as a means to improve productivity, to function without access to their electronic devices.

In particular, many devices enable users to connect from their mobile devices to a server, such as an e-mail server of an organization or corporate they are associated with, such as the e-mail server of their business or employing corporate. Moreover, many people, in addition to their professional e-mail, use their mobile devices to connect also to their personal e-mail accounts. However, the requirements associated with the two (or more) e-mail accounts of the same person may be very different. For example, organizations usually require that their e-mail systems are operated using a higher degree of security and management than most people use for their private e-mails.

Further requirements may relate to handling of attachments, contact list, calendar, notes, reminders, tasks, or others items. Similar problems may arise when using other applications provided by the organization, such as CRM, ERP or other applications.

BRIEF SUMMARY

One aspect of the disclosed subject matter relates to a computer-implemented method performed by a computerized device, comprising: receiving by a buffer server a first communication request and a device key from a mobile device; verifying the device key and a buffer server key; sending a request with details associated with the device key and the buffer server key, to a corporate server; receiving a response from the corporate server; removing data from the response, and sending a reduced response to the mobile device; receiving a user identification and a second communication request from the mobile device, for the data that has been removed; and sending the data that has been removed to the mobile device, upon verifying the user identification. Within the method, the response or the data removed from the response are optionally displayed in a native application of the mobile device. Within the method, the native application of the mobile device optionally presents secure and non-secure items in one view.

Another aspect of the disclosed subject matter relates to an apparatus having a processing unit and a storage device, the apparatus comprising a buffer server, the buffer server comprising: a mobile device communication component for communicating with a mobile device; a server communication component for communicating with a server; a password manipulation component for receiving a mobile device password to be used in conjunction with a buffer server password to authenticate the device, and for receiving a user characteristic from a mobile device communicating with the buffer server, and verifying a user using the mobile device; and a message processing component for processing requests from the mobile device before transferring to the server, and processing responses from the server before transferring to the mobile device, wherein reduced response is provided to the mobile device upon authentication of the device, and the removed data is provided to the device responsive to user identification.

Yet another aspect of the disclosed subject matter relates to a mobile communication device adapted to communicate with a corporate server, the mobile device comprising: an application for displaying in a unified list data received from the corporate server and data received from a second server at the same time, wherein data received from the corporate server is displayed only after further identification of the mobile device or a user of the mobile device.

Yet another aspect of the disclosed subject matter relates to a mobile communication device adapted to communicate with a corporate server, the mobile device comprising: an application for displaying in a secure manner data received from the corporate server, wherein data received from the corporate server is not stored in a non-transient memory unit of the mobile communication device.

Yet another aspect of the disclosed subject matter relates to a computer-implemented method performed by a computerized device, comprising: notifying an e-mail user that a decoy e-mail will be sent; sending a decoy message to the e-mail user, the decoy message comprising a link; and raising an alert related to an illegitimate user or malware opening the decoy message, responsive to said link being accessed.

Yet another aspect of the disclosed subject matter relates to a computer-implemented method performed by a computerized device, comprising: receiving a corporate server password C; encrypting C with a first private key to obtain X; extracting $X_1$ and $X_2$ from X; encrypting $X_1$ with $X_2$; and encrypting $X_2$ with a second key, wherein $X_1$ is stored on a mobile device, $X_2$ is stored on a buffer server, such that the mobile device securely communicates with the corporate server through the buffer server.

Yet another aspect of the disclosed subject matter relates to a computer-implemented method performed by a computerized device, comprising: receiving a corporate server password C; generating a password L; and encrypting C with L to obtain E, wherein L is stored on a mobile device, E is stored on a buffer server, such that the mobile device securely communicates with the corporate server through the buffer server.

Yet another aspect of the disclosed subject matter relates to a computer program product comprising: a non-transitory computer readable medium; a first program instruction for receiving by a buffer server a first communication request and a device key from a mobile device; a second program instruction for verifying the device key and a buffer server key; a third program instruction for sending a request with details associated with the device key and the buffer server key, to a corporate server; a fourth program instruction for receiving a response from the corporate server; a fifth program instruction for removing data from the response, and sending a reduced response to the mobile device; a sixth program instruction for receiving a user identification and a second communication request from the mobile device, for the data that has been removed; and a seventh program instruction for sending the data that has been removed to the mobile device, upon verifying the user identification, wherein said first, second, third, fourth, fifth, sixth and seventh program instructions are stored on said non-transitory computer readable medium.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
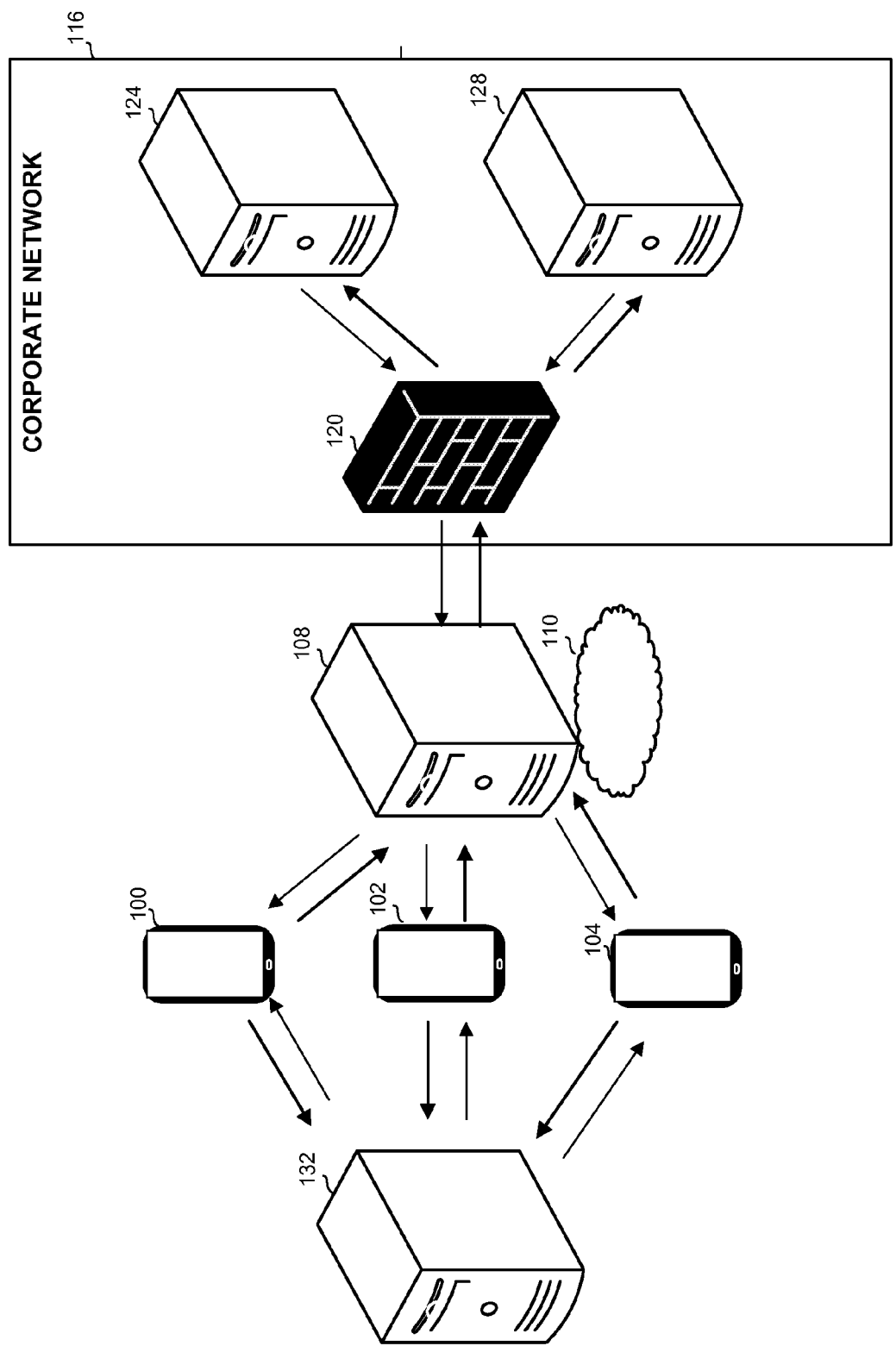
FIG. 1 shows a schematic illustration of components in a computing system, in accordance with some embodiments of the disclosed subject matter.

In order to increase the usability of mobile devices, there is a need in the art for an apparatus and method for securely using organizational applications, or gaining secure access to corporate data such as e-mails, on a mobile device.

The disclosed subject matter is described below with reference to flowchart illustrations and/or block diagrams of methods, apparatus (systems) and computer program products according to embodiments of the subject matter. It will be understood that some blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is the need of users to connect to their organizational applications or e-mail accounts from their mobile devices, while maintaining the security level required by the organization, such that if the device is stolen, no sensitive corporate information is exposed to unauthorized people, wherein corporate information may include data related to the corporate business data, corporate credentials, or other types of data. The security level should be such that an unauthorized user will not be able to access any sensitive materials related to the corporate, whether the legitimate user has seen or used these materials before or not. For example the unauthorized user should not be able to view e-mails, whether the legitimate user has read them before or not.

Another technical problem dealt with by the disclosed subject matter is the need to view e-mails sent to different accounts of the same user, such as a private e-mail account and a corporate e-mail account, such that both types of e-mails may be viewed using the same application, but e-mails associated with the corporate may be accessed using stricter security policy, as set by the corporate. The items may be viewed using an application such as a native application which is default to the device, or any other application.

Yet another technical problem dealt with by the disclosed subject matter is the need to enable a user to download e-mails or other materials when the device is connected to a network, and view the materials at a later time when the device may be disconnected, without compromising on the security, such that an unauthorized user may not view the materials.

Yet another technical problem dealt with by the disclosed subject matter is the need to provide profiling data, usage reports or other managerial data related to the quantitative or qualitative usage the organization users make of the various options.

Yet another technical problem dealt with by the disclosed subject matter is the requirement for a method and apparatus which are easy to use, do not place heavy burden on a user when using applications and functionalities of the mobile device which are not related to the corporate, and easy to install or require no installation at all. The method and apparatus should provide high flexibility such that different security settings or policies may be enforced by the corporate. The method and apparatus should use the native applications of each device, such as the e-mail or other applications that are by default installed on the device, so that the user does not have to get used to another application and can continue using the applications he or she is used to.

Alternatively, any other application providing the same functionality may be used, such as an e-mail application other than the default e-mail application.

Yet another technical problem dealt with by the disclosed subject matter is the provisioning of a password generation and usage mechanism for authenticating the mobile device as well as the user's identity in order to view sensitive information of the corporate server.

One technical solution relates to providing a buffer server that buffers between mobile devices associated with a corporate or corporate employees, and a corporate server, such as the mail server, such that no direct communication takes place between a mobile device and the corporate server. For example, the only IP address available to the device to access corporate data is that of the buffer server.

An account associated with the buffer server is created on a mobile device, wherein a first password is stored on the mobile device, and a corresponding second password is stored on the buffer server. The first and second passwords are detailed further below. The buffer server and the mobile device use the "push mail" methodology such that the buffer server retrieves incoming e-mails from the corporate server and passes them to the mobile device, wherein the data may be retrieved from the corporate server only if the first server and the second server correspond to each other and are verified by the corporate server, thus verifying the legitimacy of the device. However, the buffer server sends to the mobile device only a portion of the data received from the corporate server, such as e-mail subject and/or sender and/or date. If and when the user wishes to see the full e-mail, he or she can provide a user password, which is different from the first password, to the buffer server, the password preferably stored neither on the mobile device not on the buffer server, and after authentication the full item is sent to the mobile device.

The authentication and passwords mechanisms ensure that even if the device is stolen or an unauthorized person or malware gets access to the device, only partial and harmless information is exposed without providing the user password.

The authentication mechanism may be designed such that each of the mobile device and the buffer server exclusively stores the first and the second passwords, respectively, such that data may be retrieved from the corporate server only if the two passwords are available, correspond to each other, and correspond to the corporate server. This combination of first password, second password and user password may enable only devices registered with the buffer server to receive e-mails through the buffer server, and ensures on the other hand that an unauthorized user having the mobile device or even the user password, cannot gain easy access to other accounts registered with the buffer server.

This authentication mechanism can be incorporated into the device native applications, for example a native e-mail application which presents e-mail messages associated with multiple e-mail accounts, such as a low-security private e-mail account and a higher-security corporate e-mail account. Native application may refer to a default or original application that is pre-installed with the device, such as default e-mail applications.

When a user opens the mail application, the low-security mail messages are presented normally, while for the high-security ones only some details are presented, until the user enters a password. After authenticating the user by the buffer server the full e-mail content is received.

In some embodiments, the e-mail content is not stored on the device, and after a session is over, the e-mails content cannot be viewed unless the user is re-authenticated. Thus, an unauthorized user who got hold of the device is unable to view the secured information.

The buffer server may be implemented as part of the corporate network, for example behind a corporate firewall, or on the internet, for example using private or public cloud computing.

In some embodiments, the mobile device can be installed with a dedicated application for performing tasks such as user login, presenting different types of attachments, presenting email messages or the like.

Alternatively, the mobile device can operate without an installed specific application, but using only native applications, such as a native e-mail application and a browser. When an e-mail associated with the corporate is received, it may contain only a link to the full e-mail cached on the buffer server. In order to start a session in which the user can view the mail, the user is directed to a web page displayed for example in a browser, in which he is asked to provide the user password, after which the user may view the mail in the native mail application. Attachments of type not supported by the mail application may be viewed in a browser or in the dedicated application, if installed.

After the user password was provided, a session may be kept open in the corporate server for a predetermined configurable period of time, for example ninety minutes. Each request to retrieve the content of an e-mail within the predetermined period of time is responded without having to re-provide the user password, One technical effect of utilizing the disclosed subject matter is providing a corporate with a method and apparatus for enabling employees or other people to connect securely to their e-mail or other applications on the corporate server, using their mobile devices. The disclosed method and apparatus enable secure communication using a mobile device password and a buffer server password associated with the corporate server, as well as a user password. The mobile device password is stored only on the mobile device, the buffer server password is stored only on the buffer server, and the user password not stored on any of the devices.

Another technical effect of utilizing the disclosed subject matter enables a user to view e-mails from multiple sources requiring different security levels, using a unified mail application, such that each mail is presented in a manner complying with the relevant security policy.

Yet another technical effect of utilizing the disclosed subject matter enables the secure communication of a mobile device with a corporate server with minimal or no installation of components. The user can thus use the native application for his or her device which he or she is familiar with, without having to get used to a new interface.

Yet another technical effect of utilizing the disclosed subject matter enables a user to download e-mails or other materials when the device is connected to a network, and view the materials at a later time when the device may be disconnected, without compromising on the security, such that an unauthorized user may not view the materials.

Yet another technical effect of the disclosed subject matter relates to providing profiling data, usage reports or other managerial data related to the quantitative or qualitative usage the corporate users make of the various options.

Referring now to FIG. 1, showing an exemplary environment in which the disclosed method and apparatus are used. The environment comprises one or more mobile devices such as devices 100, 102, or 104 which may support e-mail capabilities. Devices 100, 102 or 104 may be of one or more types for example a mobile phone, a laptop computer, a tablet, or the like, using any operating system such as any version of iOS, Android, Windows, or the like.

It may be desired by a user of any of devices 100, 102 or 104 to be able to operate an application on the device, such as an e-mail application which may be native to the device, or may be a third party application. The user may further wish to view e-mails associated with two or more e-mail accounts, wherein at least one of the accounts is a secure or corporate e-mail account.

In some embodiments, each of devices 100, 102 or 104 may communicate with a buffer server 108, which is associated with a corporate network 116. Buffer server 108 may be implemented as part of corporate network 116, as an external server, on a private or public computing cloud 110 or in any other configuration.

Buffer server 108 may communicate with servers of corporate network 116 through firewall 120 protecting all communication of corporate network 116 with the external world. Corporate network 116 may comprise any one or more servers such as servers 124 or 128, one or more of which may be an e-mail server, an application server, a specific business server or the like.

Corporate network 116 and in particular firewall 120 may be designed to block all mobile traffic except for traffic that comes through or from the IP of buffer server 108. Since in some embodiments all mailing communication is performed using the standard ActiveSync protocol, a corporate may block all ActiveSync communication except for ActiveSync communication from the IP of buffer server 108, thus eliminating a potential attack vector on the corporate network. Therefore, by serving communication from mobile devices only through buffer server 108 and not directly from any mobile device, an attack may be blocked and communication security is enhanced.

Thus, servers within corporate network 116 receive no information and are unaware of any mobile device, and their mobile communication with the mobile devices is performed solely through buffer server 108. On the other hand, the only IP address available to the mobile devices associated with the corporate, is that of buffer server 108, such that the no direct communication takes place between the corporate servers and the mobile devices.

It will be appreciated that any of mobile devices 100, 102 or 104 may communicate with any additional one or more servers such as server 132, and receive information from server 132. In some embodiments, any of mobile devices 100, 102 or 104 may comprise a native application such as a native e-mail application which may present at a same time e-mails from an e-mail account associated with the corporate, and another e-mail account not associated with the corporate, such as a web mail account.

In some alternatives, buffer server 108 may be located within the organization network, for example behind firewall 120, or behind firewall 120 and before a second firewall, such that servers 124 and 128 are behind the second firewall.

Figure 2A:
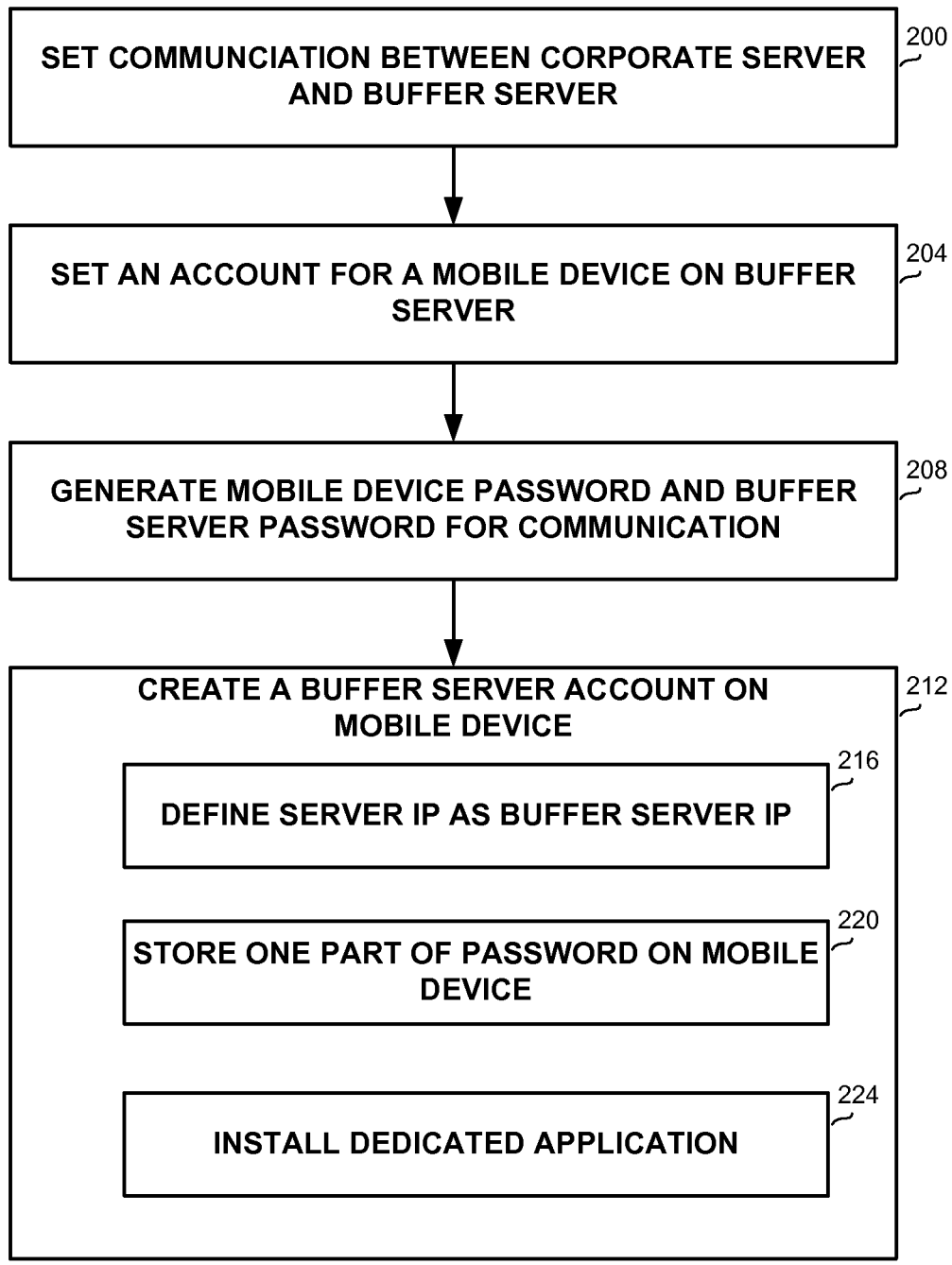
FIG. 2A is a flowchart of steps in a method for establishing communication between a mobile device and a buffer server associated with a corporate, in accordance with some embodiments of the disclosed subject matter.

Referring now to FIG. 2A, showing a flowchart of steps in a method for establishing communication between a mobile device and a buffer server associated with a corporate.

On step 200, communication may be set between a corporate server such as an e-mail server and a buffer server. The corporate server receives the IP address of the buffer server, and the corporate server may be adapted to not receive communication from any mobile device, but only through the buffer server.

On step 204, an account may be set on the buffer server for a particular mobile device. The buffer server may receive an address, a name, or any other ID of the device, as well as a user password, which a user of the mobile device will have to enter when communicating with the corporate.

On step 208, two related passwords, such as a 2-part password, may be generated for authenticating the mobile device, such that both passwords are required for identifying the mobile device and establishing communication there between the mobile device and the buffer server, and for receiving data associated with the mobile device from the corporate server. In some embodiments, each of the mobile device and the buffer server may store one of the passwords and not the other, such that if an unauthorized user obtains one of the passwords, for example the password stored on the mobile device, this is still not enough to obtain data from the corporate server regarding other accounts. In some embodiments, the two passwords may be generated from a corporate server key, such that the device key and a buffer server key can be verified given the corporate server key.

On step 212, an account associated with the buffer server is created on the mobile device. Step 212 may contain substep 216 of defining the IP address of the buffer server as a server IP address on the mobile device.

On substep 220, the mobile device password generated on step 208 may be stored on the mobile device.

It will be appreciated that a native application, such as but not limited to an e-mail application of the mobile device requires no specific adaptation, and the application accesses the buffer server in the same manner it accesses other mail servers, using the IP address of the buffer server. The different appearance of the secure e-mails (until full content of e-mail is downloaded after user verification) is due to the buffer server behavior and not the native application.

On optional step 224, a dedicated application may be installed on the mobile device, wherein the application allows a user to use the full functionality of the disclosed method and apparatus. However, step 224 may be omitted, such that some basic functionality for example login to the buffer server is provided, for example, by a default browser of the device. In some embodiments, the dedicated application may be used for further tasks, such as viewing e-mail attachments, files, or the like. It will be appreciated that subject to policy, some attachments may be opened in other applications, such as a native e-mail application.

Figure 2B:
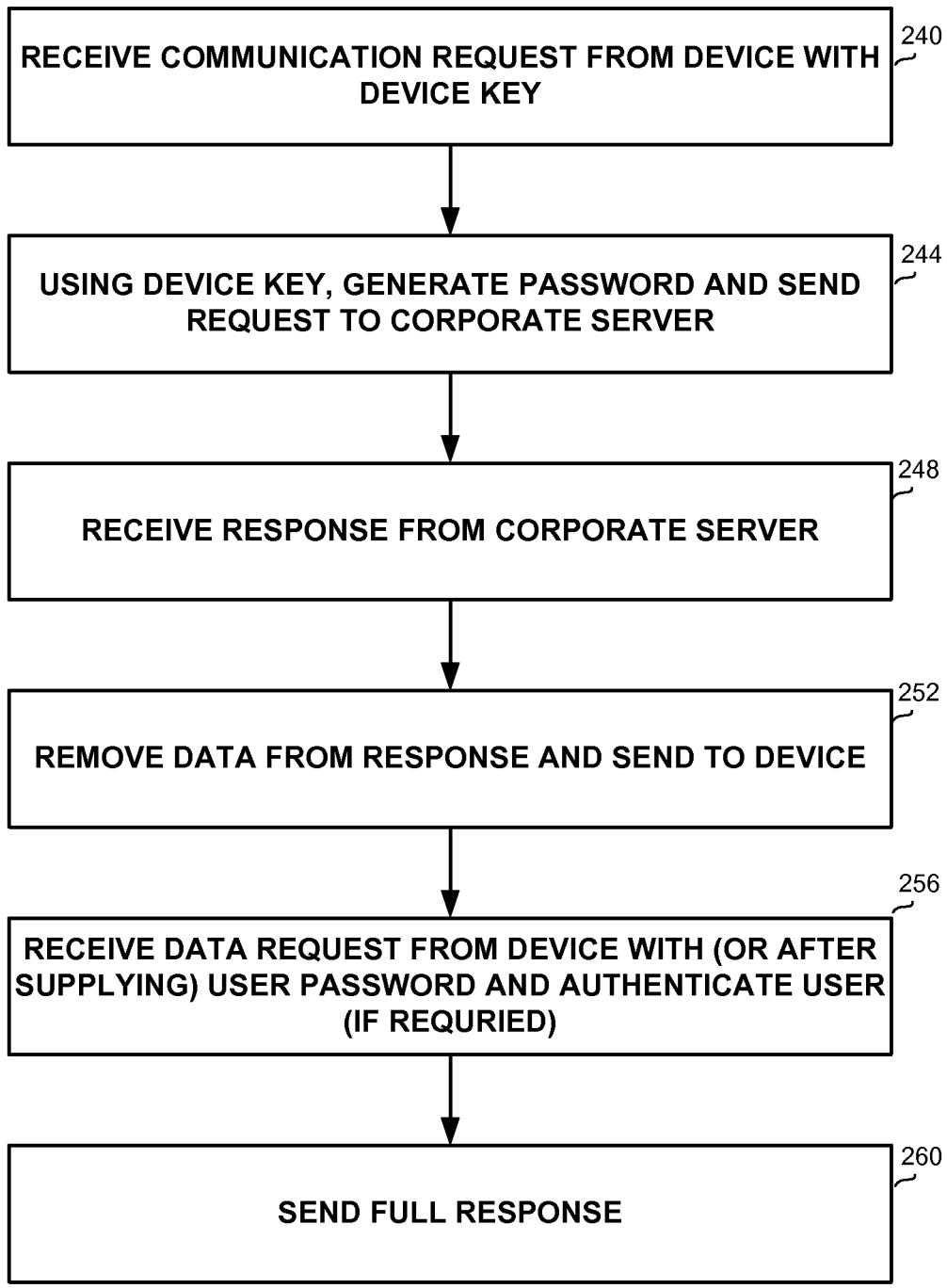
FIG. 2B is a flowchart of steps in a method for communication between a mobile device and a corporate server via a buffer server, in accordance with some embodiments of the disclosed subject matter.

Referring now to FIG. 2B, showing a flowchart of steps in a method for communication between a mobile device and a corporate server via a buffer server, in accordance with some embodiments of the disclosure On step 240, ongoing communication may occur between the mobile device and the buffer server, using for example a "push mail" technology. The communication may comprise sending a request or message by a mobile device to the buffer server from, wherein the request is associated with a device key such as the mobile device password generated on step 208 of FIG. 2A, as stored on the mobile device, and/or any other identification parameters such as device ID, username, user agent or the like, which enables the unequivocal identification of the device. The identification parameters may be a part of the communication request, or it may accompany, follow or precede the request. The request may be sent using the ActiveSync over HTTPS protocol.

In some embodiments, the e-mail native application may be constantly communicating with the buffer server, as it communicated with other mail servers, even when the user is not using the device or the mail application. On each such communication, the relevant identification parameters, which may include the mobile device password stored on the device. This password may then be used by the buffer server for validation, together with the buffer server password that is stored on the buffer server to authenticate the device and retrieve the e-mail messages from the corporate server.

Using this mechanism, the headers of the e-mails may be received automatically, but the potential harm if the device is stolen is limited since the full content is not available, The communication may continue while an application associated with the corporate such as an e-mail application is active, for each e-mail message, after a predetermined time during which a request has not been issued, or the like, in accordance for example with corporate policy.

On step 244, the buffer server may retrieve a corporate password using the mobile device password and its own password, and may send the communication request, or another request generated upon the communication request, with the passwords or data derived from the passwords to a corporate server.

Alternatively, the buffer server may merely verify that the mobile device password and its buffer server password correspond, and may send the passwords, or data derived from the password to the corporate server which may then verify the matching between the mobile device and the buffer server, or the matching with the corporate password.

The request may be sent to the corporate server, such as e-mail server also using ActiveSync over HTTPS or VPN. Part of retrieving the corporate password may be authenticating the mobile device using the mobile device password sent with the request. It will be appreciated that in some embodiments the buffer server may send just the two passwords, such that the corporate server is responsible for validating the password parts and for authenticating the device.

On step 248, a response may be received by the buffer server from the corporate server, after the passwords have been verified, thus verifying the authenticity of the mobile device. The response, including for example one or more e-mail messages may also be sent to the buffer server using ActiveSync over HTTPS or VPN.

On step 252, the buffer server may remove data from the response to obtain a reduced response, such that if the remaining data is received by an unauthorized recipient, little or no harm is done. The data removal may be in accordance with the corporate policy and may include removing, for example, the e-mail body, parts of the subject line, some fields of a contact, calendar, notes, tasks, reminders items, or the like. The buffer server may then send the reduced response or message to the mobile device, using for example ActiveSync over HTTPS. The reduced response may contain a placeholder such as an empty frame, which serves as an indication to a user that more data is available upon identification.

On step 256, a request may be received by the buffer server from the mobile device, to receive the full details of the message or messages. The first request in a session may be sent for example when the user tries to open the first e-mail in a session. In response, the user is directed to the dedicated application to provide the user password. If such application is not installed, the user may be provided with a link to a page presented by a browser. The user may then enter the user password using the application or the web page. It will be appreciated that some policies may be determined for requiring a user password. For example in highly sensitive environments every request may be required to be accompanied with the user password, alternatively the first request after a predetermined idle period may require a password, a request after a predetermined session length may require a password, or the like. The request may be sent as an HTTPS request. The user password may be authenticated by the buffer server to ensure that the user is indeed an authorized user of the device.

In some embodiments, other authentication methods may be used, such as using biometric characteristics, for example fingerprint, retina print, voice print, or the like. For example, fingerprint recognition may be used, such that on step 204 the user's fingerprint is provided to the corporate server, and on step 256 the user is authenticated by comparing the provided fingerprint or characteristic thereof to the stored one or characteristic thereof. The authentication may also be used for Single Sign On (SSO), such that using the user password or characteristic, the user may sign into a multiplicity of systems.

On step 260, the buffer server, after having authenticated the user on step 256, may send the full message to the mobile device, including the details that have been reduced. The message may be sent using HTML over HTTPS. In some embodiments, ActiveSync is not used for sending the full response since more sensitive information is being sent to the device at this stage, and ActiveSync may be more vulnerable than HTTPS.

Once the full response is received by the mobile device, it is displayed as any e-mail message. If a placeholder has been provided instead of the real content, the placeholder may now be replaced with the actual content.

The same process is repeated for each e-mail the user wishes to see. If there no other policy takes effect, as long as the session is open, no further identification is required from the user. In some embodiments, the received content is not stored on the mobile device. Then, once the session is over, if the user wishes to view any message, including messages the user had already seen, the user has to start a new session against the corporate server by entering the user password. Since the full content of the messages are not stored on the device, if an illegitimate user obtains the device, he or she cannot view the full items since they cannot provide the user password. However, storage on the device may be enabled in accordance with corporate policy. For example, it may be allowed to store contents for a predetermined period of time, only contents of particular types, only contents received from particular sources, or the like In some embodiments of the disclosed communication method, the communication between each of the mobile devices and the buffer server, excluding sending the full contents of messages, may be carried out using the standard ActiveSync protocol, which is securely transmitted over HTTPS. Modern smartphones and tablet computers, such as devices running Android or iOS operating systems support the ActiveSync protocol as the default protocol for all Exchange accounts defined on the device.

The communication between the buffer server and the corporate server may be carried out using ActiveSync over HTTPS, or a VPN tunnel.

All the data that passes through the buffer server may be inspected and filtered or blocked to adhere to the corporate policy as may be implemented by Information Technology (IT) security professionals associated with the corporate.

Using the disclosed method, a malware application running on a mobile device can communicate with the buffer server using the stored mobile device password (derived for example from the corporate password) and can receive the e-mail headers. However, such malware will not be able to provide the user password which is not stored on the mobile device, thus eliminating access to the full contents of e-mail messages.

It will be appreciated that the buffer server may enforce a login disconnect policy, e.g. maximum unsuccessful login attempts, to prevent a brute force attack on the buffer server or the corporate servers.

Figure 3A:
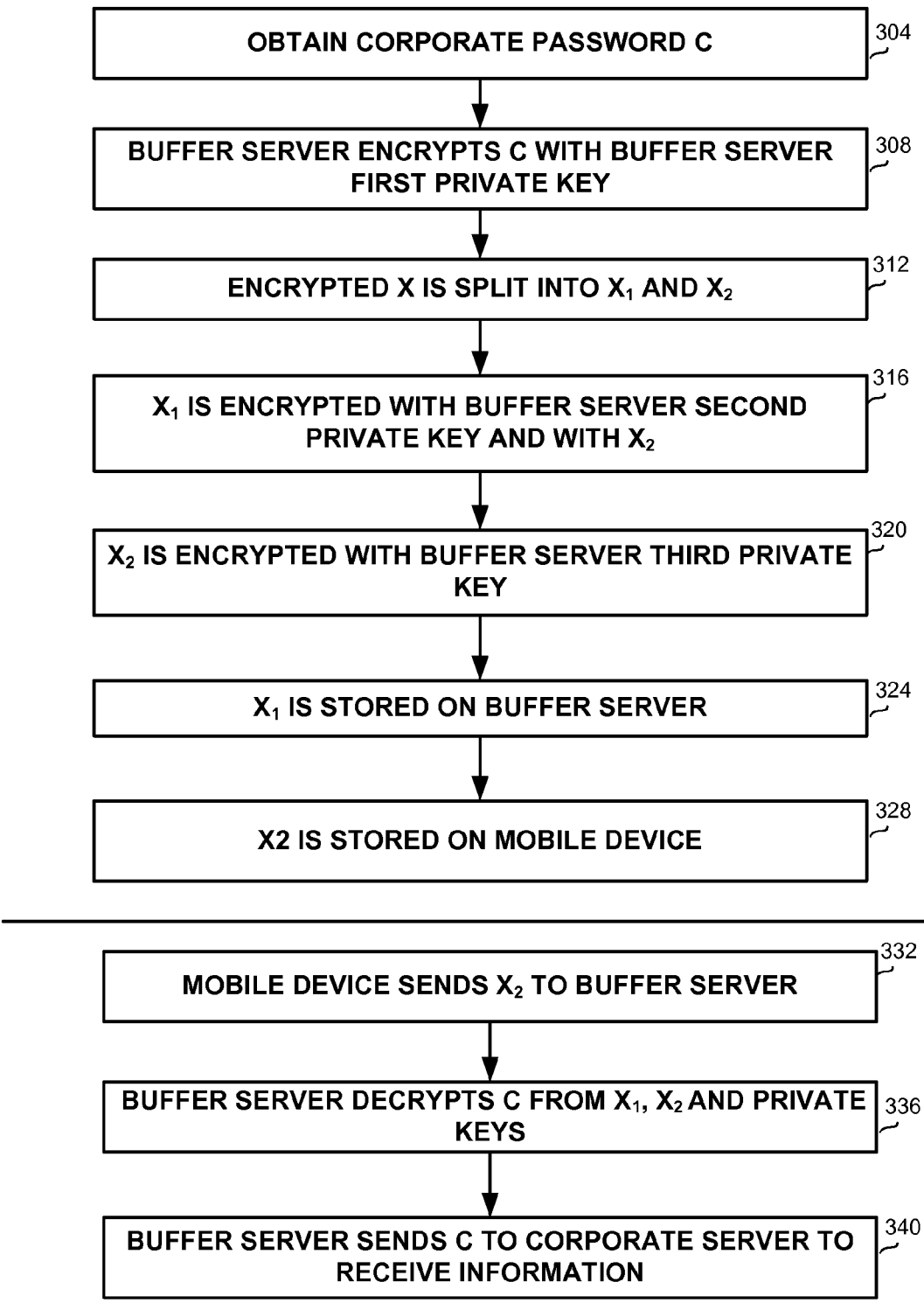
FIG. 3A is a flowchart of steps in a first method for generating and using a 2-part password, in accordance with some embodiments of the disclosed subject matter.

Referring now to FIG. 3A, showing a flowchart of steps in a first method for generating and using a 2-part password, as required by step 208 of FIG. 2A above.

On step 304 a corporate password C may be obtained by the buffer server.

On step 308 the buffer server may encrypt password C using a first private key. The encryption may be performed using, for example, the AES 256 CBC standard.

On step 312, the encrypted X password may be split, for example by being represented in base64 and split, such as bitwise split into at least two parts: $X_1$ and $X_2$. However, $X_1$ and $X_2$ may be extracted from X in any other manner.

On step 316, $X_1$ may be encrypted using a second private key, and then may be encrypted again using $X_2$.

On step 320, $X_2$ may be encrypted using a third private key.

On step 324, encrypted $X_1$ may be stored on the buffer server, and on step 328 encrypted $X_2$ may be stored on the mobile device.

Once the passwords are stored, they may be used for establishing communication.

On step 332, the mobile device may send a request together with encrypted $X_2$ to the buffer server.

On step 336, the buffer server may decrypt $X_2$, then decrypt $X_1$, and then reconstruct X and decrypt C.

On step 340, the buffer server may send C with a request to the corporate server to receive information.

Alternatively, the buffer server may send $X_1$ and X, such that the buffer server decrypts C and compares it to a password stored thereon.

Using this method, encrypted $X_1$ is only stored on the buffer server, while encrypted $X_2$ is only stored on the mobile device, and X is not stored at all.

For every request the mobile device generates, it may automatically attach the $X_2$ password. This may be done by the ActiveSync engine on the mobile device.

Figure 3B:
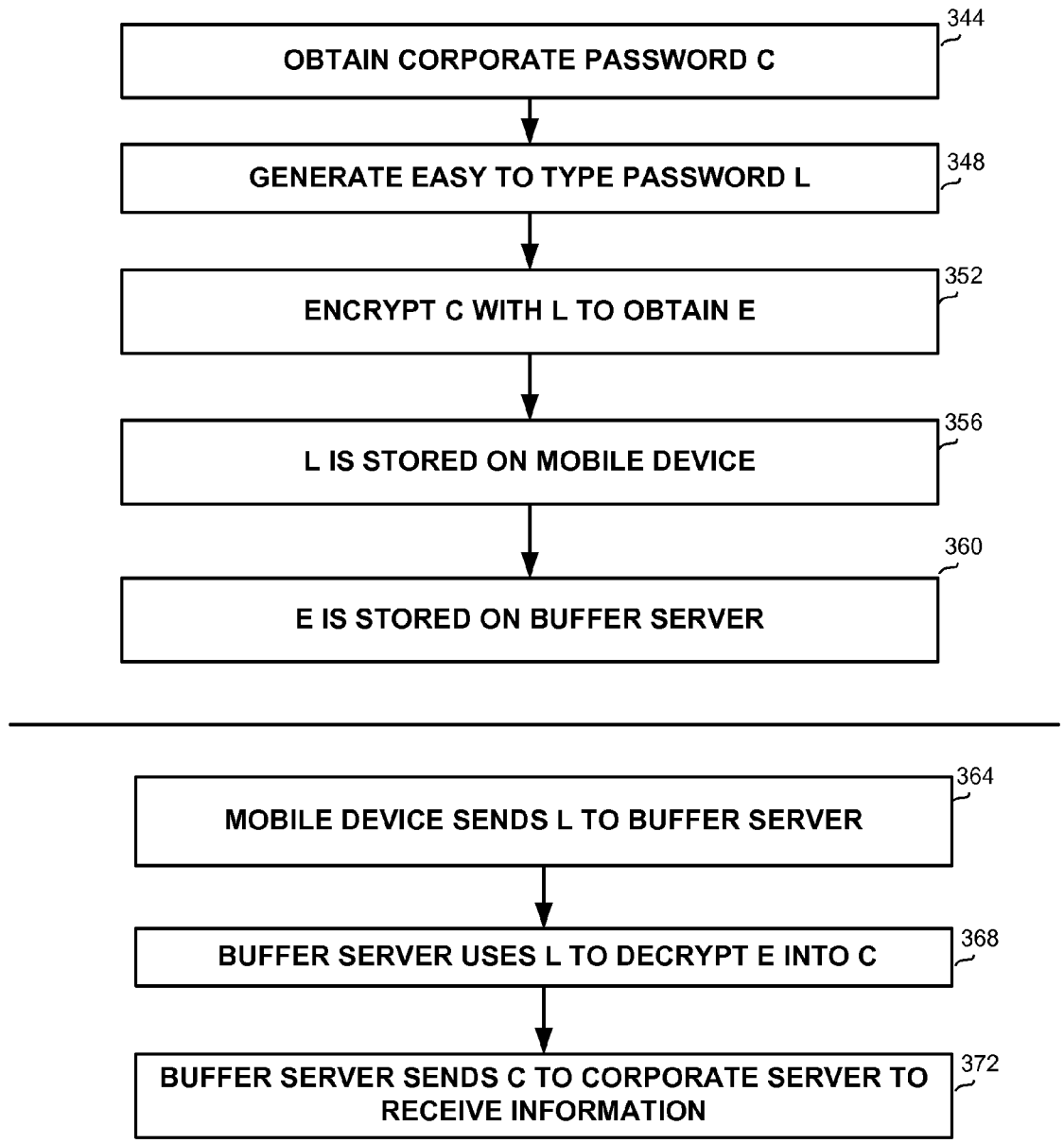
FIG. 3B is a flowchart of steps in a second method for generating and using a 2-part password, in accordance with some embodiments of the disclosed subject matter.

Referring now to FIG. 3B, showing a flowchart of steps in a second method for generating and using a 2-part password as required by step 208 of FIG. 2A above.

On step 344 a corporate password C may be obtained by the buffer server.

On step 348, the buffer server may generate a password L. Password L may be an easy-to-type password which may be typed by a user.

On step 352, C may be encrypted using L to obtain E.

On step 356, L may be stored on the mobile device, and on step 360 E may be stored on the buffer server.

Once the passwords are stored on the mobile device and on the buffer server, respectively, they may be used for establishing communication.

On step 364, the buffer server may receive L with each ActiveSync request sent from the mobile device.

On step 368 the buffer server or the corporate server may use L to decrypt E and retrieve C.

On step 372, the buffer server may send C to the corporate server with the request. If C is to be retrieved by the corporate server then only L will be sent.

A user such as an IT administrator may change the corporate password C based on the corporate policy. In such case, the buffer server may regenerate a new E password to be associated with each mobile device it communicates with.

Using the methods disclosed in FIGS. 2A, 2B, 3A and 3B help protect against theft of corporate credentials, even if a device is stolen or infected by malware.

Modern mobile operating systems provide a secure mechanism to protect the Exchange password used for accessing e-mail accounts. Even if an attacker succeeds in breaking this security mechanism and extracting the mobile device password, the attacker will only gain access to the buffer server and may receive, at most, the non-sensitive data as prepared and sent on step 252 of FIG. 2B.

An attacker cannot login to the corporate server using the extracted password since the corporate server requires the user login which is not stored on the mobile device.

Additionally, the corporate server IP address is not to be stored on the mobile device but only on the buffer server, and the mobile device is configured only with the buffer server IP. Thus, an attacker cannot expose the real corporate server IP address, which makes an attack on the corporate network more difficult.

Figure 4:
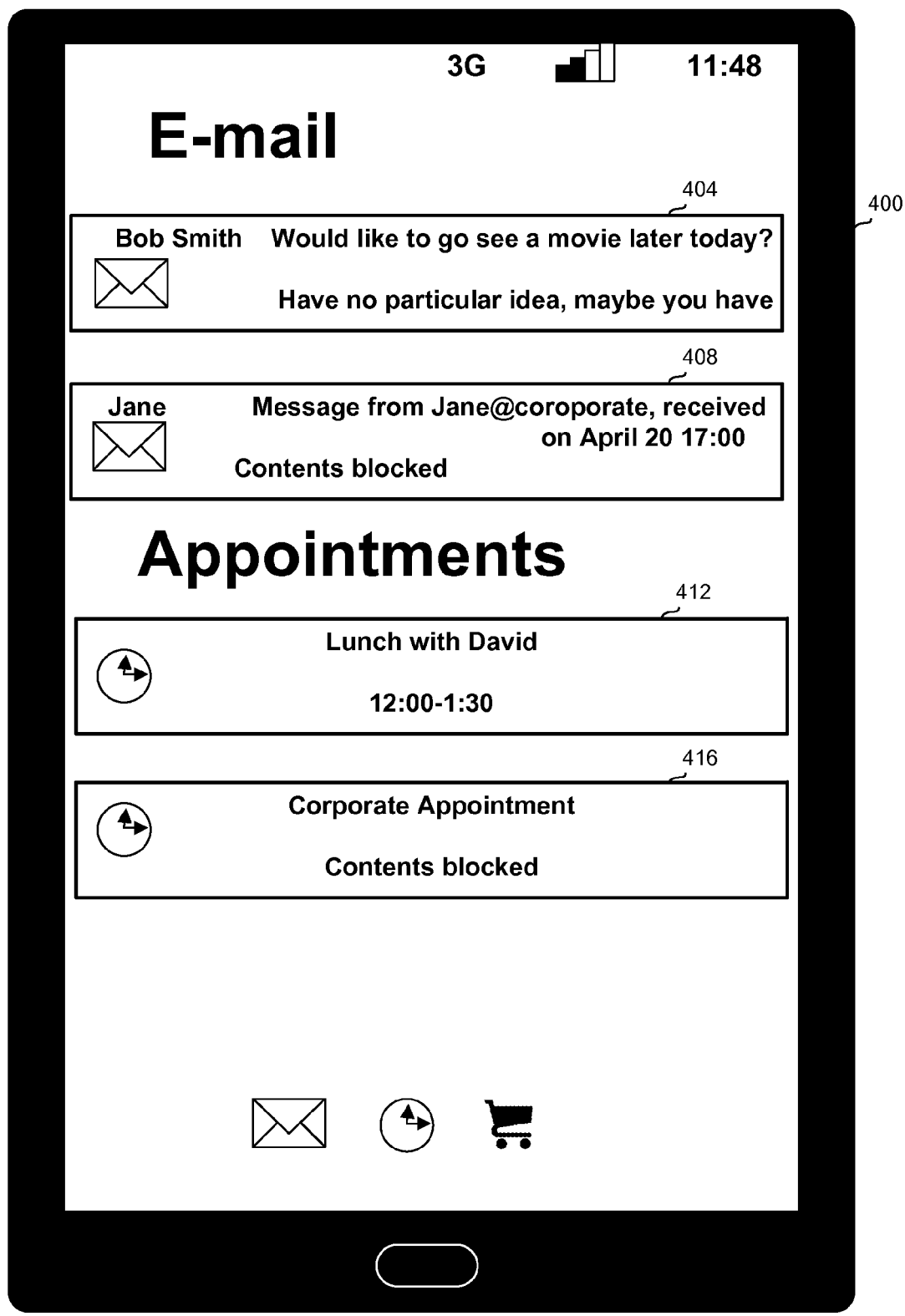
FIG. 4 is a schematic exemplary illustration of a screen illustration of a mobile device with a mail and calendar application, in accordance with some embodiments of the disclosed subject matter.

Referring now to FIG. 4, showing a schematic illustration of a mobile device such as mobile device 400, with an e-mail and calendar application.

The application, which may be a native application that is by default installed on the device, or any other application such as a third party application, presents e-mail messages 404 and 408 on a unified representation, wherein e-mail 404 is a message received via a private account of the user, and e-mail 408 is a message received via a corporate account of the user, in accordance with the detailed methods and devices. Thus, the full details and contents of private e-mail 404 are shown, while for corporate e-mail 408 only some non-sensitive details are presented. If the user wishes to see the full message, he or she should access the message for example by clicking on it, and supplying their user password. The buffer server then sends the full message content to the mobile device. In some embodiments, after supplying the password for the first time in a session, all corporate mail messages are fully displayed automatically. Alternatively, after supplying the password for the first time in a session, each message is fully displayed once the user clicked on it. The messages are not stored on the device, so in order to view the same or any other message once the session has been terminated, the user has to start a new session by entering the user password.

The application may further present appointments such as appointment 412 received from a private account, which is fully displayed, and corporate appointment 416 for which only non-sensitive data is displayed until the user password is supplied. In some embodiments, entering the password once releases all mail messages and all appointments.

Attachments of corporate e-mail messages may be viewed in a number of methods. For example, in devices that support native viewing of complex document types, such as PDF, PPT or the like, this ability may be used for presenting attachments. In other devices, the buffer server may convert all attachments to PDF or Images and may use the mobile browser's native capability to show images, for example using a browser. Alternatively, a dedicated application may be used for presenting the documents. Zip or other packed files may also be viewed by presenting a list of the files contained within the ZIP file, and when any of the files is clicked or otherwise indicated, it may be opened using the native capabilities or the dedicated application. However, it will be appreciated that the attachment should generally not be stored or cached on the mobile device, at least as is, but only presented by it.

It will be appreciated that the exemplary application of FIG. 4 may also refer to contacts, tasks or other items, in a unified manner, such that the full details are always available for the private items, while the corporate items are only partially presented, and the full contents are presented only once a user password is provided.

It will be further appreciated that the displayed application is exemplary only and that many other embodiments may be provided, such as a tabbed view or others.

The buffer server thus enables users to use their mobile device's native application or applications to view and send messages, appointments or other items in a secure and controlled manner.

In some embodiments, the user may be prevented from performing any action with the e-mail messages, including for example sending, replying, forwarding, deleting or moving emails between folders if the user is not logged-in. This prevention may disable an illegitimate user from causing harm using the data available when the user is not logged in. The dedicated application may alert a user trying to perform any such activity that the action will be cancelled and all changes will be lost once a session will be established after the user provides a password, and suggest the user to login in order to perform such action.

In some embodiments, a system administrator can define a timeout period after which a user may be required to reenter the password before the user can continue accessing e-mails. An IT administrator may define different timeout periods based on different policies, based for example on IP range of the mobile device, device type and version, geographic location of the device, time or day, black or white list of users or devices, pre-defined user groups, or other parameters.

The details displayed before the password is entered may depend on corporate policy. For example, some employees may receive the message subject and body, while others may receive only the subject, while yet others only the first name of the sender, or the like. An IT administrator may define one or more filters on the exposed fields and on the e-mail content itself. Such filter may be defined, for example, to: remove numbers or digits, remove the contents or part thereof according to regular expressions, remove specific words, terms or phrases, allow maximal message length, remove words, terms, sentences or block the message entirely if the message is identified to be sensitive or suspicious based on pre-defined rules or content analysis, or the like. Filtering may be based on characteristics of the user, the user's role and responsibilities, device type, e-mail, or the like. Filtering may be performed as the e-mail passes through the buffer server from the corporate server to the mobile device. The buffer server may provide the filtered information to the user once the user is authenticated.

The original e-mail may be cached by the buffer server so that once the user password is received, the full content is available and can be sent to the user immediately, without having to establish additional communication with the corporate server. The mail may be stored or cached after being encrypted, for example using the AES 256 CBC standard. Encryption may be done using the user password, which is not stored on the mobile device or on the buffer server, such that no one can decrypt it except the real user.

The information filtered prior to the user entering the password, including for example e-mail attachments, may be replaced by the buffer server with predetermined content, such as an empty frame or the "Contents blocked" string in message 408. In other alternatives, and optionally depending on the operating system of the mobile device, the e-mail content may be replaced with an iframe, or with the dedicated application installed on the device.

When a user opens an e-mail on the mobile device, after the user provided the password, the content of the e-mail may be retrieved from the buffer server. In some embodiments, the e-mail is created similarly to browsing to a dynamic web page that is not cached by the browser, such that the page is always displayed based on information received from the corporate server.

In some embodiments, for every e-mail request the buffer server first checks if the user is logged in, and if not the buffer server returns a "not logged-in" message and includes a link to the buffer server login page, which may be opened by clicking.

Once the user is logged in, if the e-mail content is stored or cached by the buffer server, the e-mail content is encrypted by the buffer server using the user's password as sent during login, and sent to the mobile device, for example over a secure HTTPS channel. The user password is not permanently stored on the buffer server, but only in the volatile memory of the buffer server for the same session.

If the e-mail content is not stored or cached by the buffer, the e-mail content is fetched from the corporate server and sent back to the mobile device, through the buffer server.

When an e-mail contains attachments, the attachments may be removed by the buffer server as the e-mail passes from the corporate server to the mobile device through the buffer server. The attachments may be encrypted, for example using the AES standard, and temporarily cached or stored on the buffer server.

Attachments may be stored on the mobile device for a predefined time or not stored at all, depending on a predetermined policy. The e-mail as received by the mobile device does not include the attachment but only a link embedded in the e-mail body, and opened after the user has logged in. However, the attachment sign that indicates that an e-mail includes an attachment may still be shown by the native e-mail application. Once the user clicked on the link, the attachment is retrieved and presented to the user. When the user requests to view the attachment, then if the attachment is stored on the buffer server, the buffer server may encrypt it and send it over HTTPS to the mobile device, similarly to sending an e-mail message. If the attachment is not stored or cached on the buffer servers, the attachment is retrieved from the corporate server and sent over HTTPS to the user.

It will be appreciated that the content of the e-mail and attachments are not stored on the mobile device, unless the corporate policy so allows and under any relevant limitations such as storage duration, so that if the device is stolen the unauthorized user can not view the mail.

If a malware or an attacker gains access to the mobile device, the only information that can therefore be accessed is the non-protected items of the messages, which display only non-sensitive data. The message body may include only a link to the buffer server. This link to the real content may be operative only after the user has logged in using his or her password, from the same mobile device.

In some embodiments, all such attempts may be logged and analyzed for issuing security alerts and for preventing future attacks by profiling different attacks.

If the mobile device is stolen, then after the login timeout period has passed the user will automatically be logged out. Additionally or alternatively, the user or the IT administrator may remotely disable the stolen mobile device, by disabling the buffer server from communicating with this device, even if the user's password is provided. An attacker will not be able to view the e-mail message content, since the message content is not stored on the device and is retrieved once the user logs in. Since the user's password is not stored on the device, the attacker cannot login on the user's behalf and receive the sensitive parts of the mail content.

Figure 5:
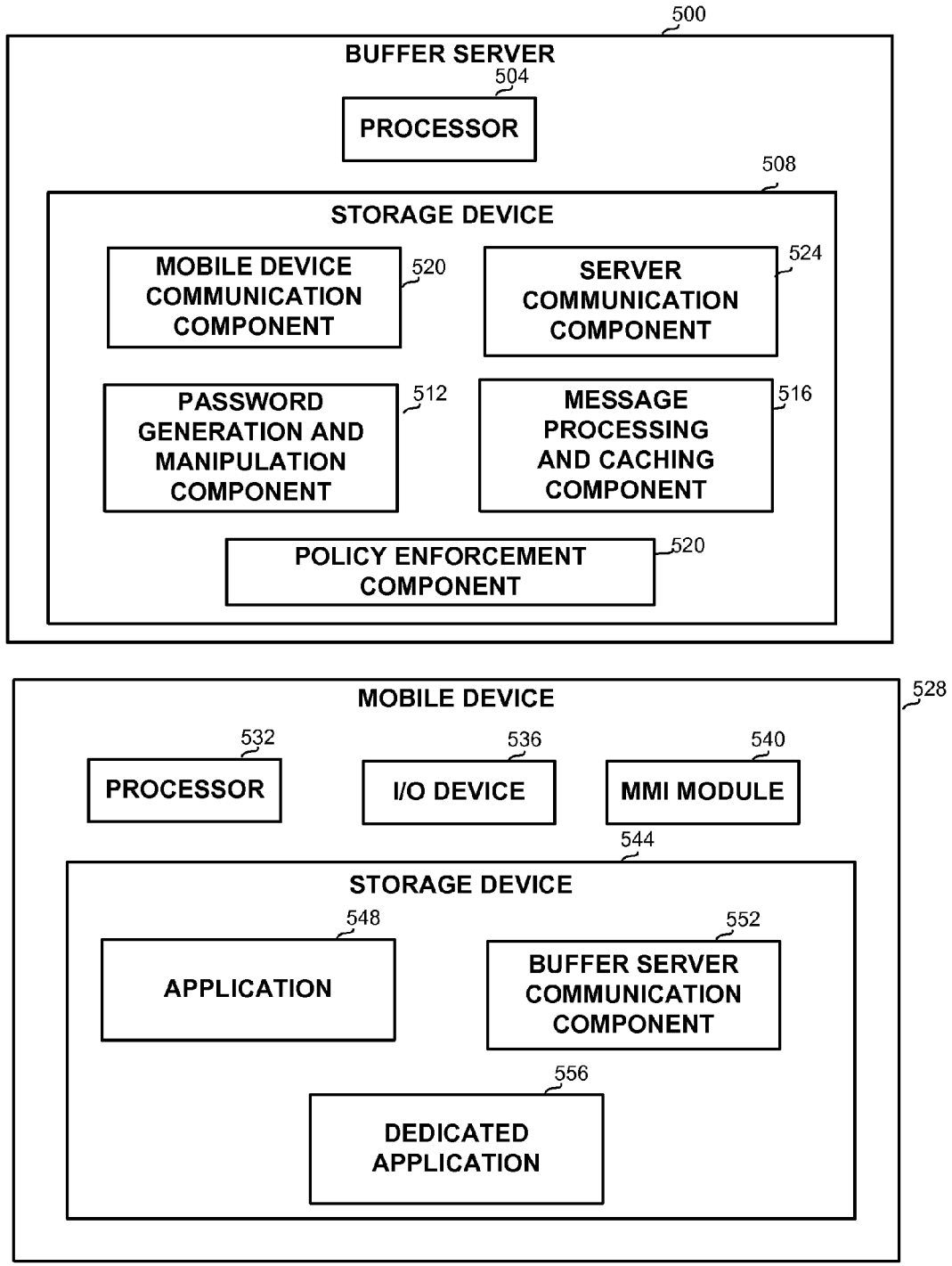
FIG. 5 is a schematic block diagram of the components in a mobile device and a buffer server, in accordance with some embodiments of the disclosed subject matter.

Referring now to FIG. 5, showing a schematic block diagram of the components in a mobile device and a buffer server, wherein the mobile device may communicate with a corporate server via the buffer server.

The apparatus enables mobile device 528 to communicate with a corporate server (not shown) via buffer server 500.

In some exemplary embodiments, buffer server 500 may comprise a processor 504. Processor 504 may be a Central Processing Unit (CPU), a microprocessor, an electronic circuit, an Integrated Circuit (IC) or the like. Alternatively, processor 504 can be implemented as firmware programmed for or ported to a specific processor such as digital signal processor (DSP) or microcontrollers, or can be implemented as hardware or configurable hardware such as field programmable gate array (FPGA) or application specific integrated circuit (ASIC).

In some exemplary embodiments, buffer server 500 may comprise one or more storage devices such as storage device 508, for storing for example passwords, e-mails, mobile device details, communication details related to one or more servers or users, or the like. Storage device 508 may be persistent or volatile. For example, storage device 508 can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like. In some exemplary embodiments, storage device 508 may retain program code operative to cause buffer server 500 to perform acts associated with any of the steps of the method of FIG. 2A, 2B, 3A or 3B detailed above.

The components detailed below may be implemented as one or more sets of interrelated computer instructions, executed for example by processor 504 or by another processor, or loaded to or stored on storage device 508. The components may be arranged as one or more executable files, dynamic libraries, scripts, static libraries, methods, functions, services, or the like, programmed in any programming language and under any computing environment.

The components loaded to storage device 508 may include mobile device communication component 520 for communicating with one or more mobile devices 528. Communication with mobile device 528 may be performed over cellular network, wireless network, or the like, and using any one or more protocols, such as HTTP, HTTPS, ActiveSync over HTTPS, or the like. The communication may be used to receive requests and passwords from a mobile device 528, and to return responses to mobile device 528, to send commands to mobile device 528, or the like.

Another component loaded to storage device 508 is server communication component 524 for communicating with a server such as a corporate e-mail server. Buffer server 500 may communicate with the server for transferring requests from mobile device 528, receiving responses, fetching additional information, receiving commands, retrieving policy, or the like. Communication with the server may be performed over any wired or wireless local or remote network, using any one or more protocols, such as HTTP, HTTPS, ActiveSync over HTTPS, or the like. Mobile device communication component 520 and server communication component 524 are designed so that all communication between mobile device 528 and the corporate server are through buffer server 500 and not directly.

Yet another component loaded to storage device 508 may be password generation and manipulation component 512 for generating corresponding passwords to be stored on buffer server 500 and mobile device 528, for authenticating the mobile device when trying to communicate using the passwords, for retrieving a password required for communicating with the corporate server, or the like. It will be appreciated that the password generation may be performed by a different computing platform and the generated passwords may be imported to the buffer server and/or the mobile device.

Storage device 508 may further be loaded with message processing and caching component 516 for receiving requests from mobile device 528, authenticating the mobile device, manipulating the request for example by replacing the password, activating server communication component 524 for sending the request, manipulating the response for example by removing sensitive data and caching it, and later sending the cached data after the user was identified.

Storage device 508 may further be loaded with policy enforcement component 520 for enforcing policy related for example to whether a user or a mobile device may access certain items, geographic or temporal limitations, or the like. In alternative embodiments, policy enforcement component 520 may be implemented as part of the corporate server.

Mobile device 528 may comprise processor 532 and storage device 544 similar to processor 504 and storage device 508 of buffer server 500, respectively. It will be appreciated that processor 532 and storage device 544 may be different than those of buffer server 500 due to their different platform, nature, requirements and uses. For example, mobile device 528 may also comprise other components required for its functionalities, such as mobile communication components, GPS component or the like.

Mobile device 528 may also comprise I/O device 536 such as a display, a keyboard, a touch sensor, a voice activated component, or the like, to interact with the device, provide commands, and receive results such as view e-mails.

Mobile device 528 may further comprise a man-machine interface (MMI) module 540 which may be used by a user to provide input to the system and to receive output from the system via any of I/O devices 536.

The components detailed below may be implemented as one or more sets of interrelated computer instructions, executed for example by processor 532 or by another processor, or loaded to or stored on storage device 544. The components may be arranged as one or more executable files, dynamic libraries, scripts, static libraries, methods, functions, services, or the like, programmed in any programming language and under any computing environment.

Storage device 508 may be loaded with application 548 used to provide any functionality to a user, for example a native e-mail application or a third party e-mail application for receiving, viewing and sending e-mail messages, native or third party calendar application, or the like.

Another component that may be loaded to storage device 544 is buffer server communication component 552 which corresponds to and is adapted to communicate with mobile device communication component 520 of buffer server 500.

A further component which may be installed on mobile device 528 and loaded to storage device 544 is dedicated application 556 designed for adding functionalities such as encrypting, caching or decrypting items on the device, enabling a user to view different types of attachments, or the like.

It will be appreciated that the buffer server 500 and mobile device 528 of FIG. 5 are exemplary only, and that multiple other structures and methodologies may be devised.

It will be appreciated that the disclosed subject matter can also be used for protecting contacts, calendar appointments, tasks, reminders, notes or other items. Similarly to e-mail messages, the sensitive information may be removed from the contacts and appointments. For example, for contacts, only the necessary fields will be exposed to the contacts application when not in session, such as name or phone. Since the device's native Caller ID functionality is based on the above information, it may be important to expose this information to the native contact application, so that the user can make calls from the phone also when he or she is not logged in.

For a calendar application, the basic appointment information is not blocked by the buffer server, including for example time, date, subject, or the like, in accordance with corporate policy. Sensitive information such as appointment notes, presentations, location or others may be blocked and are not presented in the appointment body.

However, for both contacts and calendar items, the exposed fields are configurable and may be set by an IT administrator. For example, an IT administrator may decide not to block the entire appointment notes field but only to filter out some information before it is exposed to the calendar application e.g., remove bridge phone numbers for conference call, remove numbers or digits, remove content by regular expressions, remove specific words, phrase or terms, define maximal length for a message, remove words, phrases or sentences or block entirely if the message is identified to be sensitive or suspicious based on pre-defined rules and content analysis, or the like.

As detailed below, in some embodiments, the filtered contacts or appointments may contain a link to a web page or a dedicated application in which the user may provide the user password to receive the full information. Once the user is authenticated, the secure information can be viewed using the device's relevant native application, or for non-supported information types a web browser, or a dedicated application.

In some embodiments, as contacts and appointments entries pass through the buffer server, sensitive information may be filtered out. Such that the native contacts or calendar applications do not receive this information. Only information that is permitted by the corporate IT administrator is exposed to the user by the native applications. The filtered out information may be encrypted and stored on the buffer server. In order to view the filtered information, a user is asked to login to the buffer server via a dedicated application or a web page. Once the user logged in, he or she may view the full items which may be sent from the buffer server to the mobile device over HTTPS.

In some embodiments, for example when a dedicated application is installed, the contacts and calendar items may be encrypted with the user password and stored on the mobile device such that the user can use them also when he is not logged in to the system, as detailed below.

Unlike the situation with e-mail application, in contacts and calendar applications some of the information may have to be stored on the mobile device itself. For example, as mentioned above, in order for the device to function as a phone, the contact name and phone numbers must be stored on the device, such that this functionality is available at all times, regardless of the connectivity status. However, even if a malware or an attacker gains access to the contacts or calendar native applications, only exposed information, as approved by the IT administrator, is available, while the sensitive information is not exposed to the attacker. The information is encrypted and protected with the user password which is not stored on the mobile device.

It will be appreciated that other items, such as notes, reminders, tasks or the like may be handled similarly to contacts and calendar items.

As mentioned above, the mobile device may operate with or without a dedicated application installed thereon.

In some embodiments, an IT administrator can define a policy that ensures that communication with the buffer server is enabled only for mobile devices on which the dedicated application has been installed. The application, if installed, may provide a number of advantages. For example, the application may serve as a container for presenting secure items such as e-mail messages, attachments, contacts, calendar info, notes, reminders, tasks, or the like. Additionally, based on IT policy, the application may store contacts, calendar items, e-mail messages, attachments or the like, encrypted for offline viewing, after encrypting with the user's password, which is not stored on the mobile device's nonvolatile memory. Thus, the full content of an e-mail message may not be stored on the device when the service is used without a dedicated application, and may be stored and encrypted if an application is in use, for offline access to the data. It will be appreciated that a user has to provide a password and login to the application in order to view the cached items.

The application may further validate the device integrity by checking: whether the device is hacked, if there are open ports on the device, the integrity of the SIM card and IMEI, or the like.

If a relevant application is not installed, then some items, for example attachment of non-supported types may be viewed using a native application, such as a browser. The e-mail messages, however, may always be seen using the native e-mail application.

It will be appreciated that whether the mobile device is installed with a dedicated application or not, a user may utilize the native user experience and applications of the mobile device. As communication between the mobile device and the buffer server may use reverse proxy mode, it may allow regular use of e-mail, contacts, calendar and other native or third party mobile applications.

The disclosed methods and apparatus handle data management and security and can therefore deliver the data to the mobile device in a format that can leverage native or third party applications of choice.

It will be appreciated that the disclosed method and apparatus allow the usage of multi-account mail or other applications, i.e., the use of one application, whether native or third party, for one or more protected accounts, and one or more non-protected accounts, each of which may be personal or associated with a corporate. A unified or combined inbox configuration of an e-mail application may represent to a user with a complete list of messages from the different accounts. E-mails or other items associated with the non-protected accounts may be displayed normally and possibly with a preview, while protected items may be displayed (after the device authentication) in the same unified list but with only some of the details and without a preview, as the item content is protected and remains on the buffer server. When opening a protected message for the first time in a session, a user may be requested to provide his password. Once this is done, the item will be displayed regularly in the same application as long as the session is valid. The user may be able to traverse the unified item list, and open protected and non-protected messages in any order.

The disclosed methods and apparatus may or may not mandate security policies or restrictions associated with the mobile device level. For example, no password or pin code may be required for the mobile device in order to provide the native security and management capabilities. The disclosed methods and apparatus may only mandate authentication when the user attempts to access protected data from the corporate server, and not for the general, non-protected use of the device, thus reducing the overall authentication burden for the user.

It will be appreciated that the disclosed methods and apparatus may operate in online or offline modes. Both the online and the offline modes may be available whether a dedicated application is installed or not. An IT administrator may set a policy to either allow or forbid offline mode and, if allowed, set finer restrictions, such as time limit for using offline mode, preventing attachments from being downloaded for offline use, mandating the use of a dedicated application installed on the device, or the like.

In offline mode, the user may read protected messages while there is no data connectivity with the buffer server, for example when the user is using a Wi-Fi-only device in an area with no connectivity. While the device is online, the application may synchronize with the corporate server through the buffer server and download new content to the mobile device. When sending the data, the server may encrypt the mail content, using a public key associated with the phone, such as a PKI key-pair created by the phone for offline transactions, and transfer the encrypted mail content to the client, to be stored in the application's protected database. When the user opens the mail application, the new messages will appear in the inbox in a filtered manner, similar to the way they appear in online mode. When opening a protected e-mail message, the mail application may contact a content provider installed on the device, which may be either a dedicated HTTPS server or an operating system specific provider implementation to retrieve the data. The dedicated application will ask the user for the password to login, and may use this password to decrypt the private key, which in turn enables decryption of the message. Data encryption may be performed using any system, such as hybrid cryptosystem.

If no application is installed, a user may switch to offline mode by providing the password when going online, and downloading messages for offline use, using the native e-mail application or a third party application of choice. The password may be used for encrypting the messages downloaded to the device. When trying to view a message in offline mode, the user may provide his password which will be used for decrypting the message. It will be appreciated that when switching to offline mode, the user may be requested to comply with a different set of security policies, e.g., a mandatory device password.

It will be appreciated that the disclosed methods and apparatus may include one or more profiling mechanisms for monitoring the system, for example, detection of irregular user or mobile device behavior or potential threats, followed by alerting a system administrator. The profiling and identification of suspicious behaviors may be based upon mobile device source IP; geographic location of the device, including for example country, area, distance from the IT data center, or the like; user access from suspicious physical or network locations such as anonymous proxies, satellite proxies or the like; failed login attempts; irregular use of the service, including for example irregular number of access attempts within a specific timeframe, the time it takes for the user to enter the password; irregular communication times or frequency during the day, or the like.

Additionally or alternatively, profiling of user and device behaviors may be used for automatic setting of security and regulatory compliance policies or usage restrictions. For example, if the user is logging in from a remote location, e.g., an EU resident connecting from the US, the system may prevent access to attachments, restrict the length of messages, prevent access to corporate data, or the like.

Such monitoring may also be used for enforcing policies associated with regulations. For example, if it is forbidden to let certain materials leave a particular country or area, the relevant policy may require receiving the geographic location of the device with the information request, and blocking the buffer server from sending the materials if the device is outside the country or area. It will be appreciated that additional factors may be considered part of the policy, such as but not limited to: a user of the device, type of requested information, time of request, geographic location of the mobile device, data size, data origin, or others.

The monitoring may also be used for indicating for each item whether it has been fully received by a user of the device and whether any of its attachments have been viewed. Such indications may also be used when checking the enforcement of regulations.

Using the disclosed method and apparatus, a user of the mobile device may manage the device policy, and may decide whether or not to install the dedicated application. This arrangement reduces management resources and cost and does not require IT personnel involvement. It will be appreciated that a user-defined policy is subject to and may be overridden by corporate policy applicable to the user and/or device.

It will be appreciated that the disclosed methods and apparatus may include one or more reporting mechanisms for generating reports related to the ongoing usage of the service.

When using the disclosed methods and apparatus, if the mobile device is stolen, then a user or IT administrator may send a remote wipe command to the mobile device, so that all corporate data is deleted from the mobile device and the device is blocked from accessing the buffer server and hence the corporate server. If the device is retrieved later, the user or the IT administrator can send an enable command which will allow the device to regain access to the buffer server, and make all corporate data available again. The disabling and enabling may be performed, for example, by a password associated with the encryption and decryption of the data cached on the device. The buffer server can also send remote logout commands that will not remove available data from the device and will not block future access, but will terminate the session the client may have with the server, and prevent current access to protected data. The user may log back in anytime. Such commands may be sent from a web management console associated with the corporate server or the buffer server.

Further commands may be special ActiveSync instructions to the mobile device. These instructions can also force the mobile device to delete all corporate-related information from the device, including for example e-mail messages, attachments, contacts, calendar data, notes, tasks, reminders, or the like. After initiating a wipe command, the server may block any request to login from the specific mobile device.

However, the user will not have to reinstall the device after such wipe. Native applications support these commands as part of the ActiveSync protocol, thus these commands are enabled on most devices.

It will be appreciated that although the disclosure concentrated on e-mail application, the methods and apparatus may be equally applied to any other corporate-related application, such as but not limited to CRM, ERP, project management, data repositories, any application using HTTP or HTTPS communication protocol with the corporate, or the like. Using the applications from the mobile device may comprise authenticating the mobile device as described in association with step 244 above, filtering the content received from the corporate server as described in association with step 244 above to leave only insensitive material to be sent to the mobile device, and providing the sensitive data only upon further identification of the user, as described in association with step 260 above.

It will be further appreciated that a multiplicity of applications may use single sign on (SSO), so that the mobile device communicates with one or more buffer servers using the same mobile device password, and the user may use a single password to connect to all applications.

The disclosed methods and apparatus may also be used to create a virtual drive for the mobile device on the buffer server, and to store and retrieve data to and from the virtual drive. A user may store sensitive data such as an e-mail attachment or the like on the mobile device from the disclosed application, wherein the actual storage may be done on the buffer server. Alternatively, storage may be performed directly with the buffer server if no application is installed. The data may later be retrieved once the user has communicated his password to the application, similarly to retrieving e-mail messages. It will be appreciated that data may be stored according to policy. For example, it may be determined which items may be stored on the mobile device and which on the buffer server, for how long each data item will remain in storage, enable short-term storage on the mobile device followed by longer term storage on the mobile server, or the like.

Such virtual drive may also enable sharing of a document by some users, remote editing by one or more users, downloading the item to the mobile device for editing and then storing back on the virtual drive, or the like.

A decoy mail mechanism may be employed to protect against data theft. The mechanism may employ sending a message, which is not to be opened by a legitimate user. In order to avoid opening the message by the legitimate user, the user may receive a preliminary notification about the decoy mail, informing the user not to open or delete a specific e-mail he is about to receive, at least for a predetermined period of time. The notification may be served using a preliminary e-mail, a text message, a phone call, a personal notification or the like.

If the decoy e-mail is opened, which may be detected, for example, by an access to a link embedded within the message, it may indicate that a malware obtained control over the e-mail, and is parsing the mails, and accessing links embedded therein to retrieve more information. Since the legitimate user is instructed not to open the link, opening the link may indicate a suspicious behavior, flag the user as suspicious and raise an alert.

A decoy mail may also be used for checking whether a mobile device has been stolen. The user may be notified of a specific mail he will be receiving from the corporate, which he should not open. If a request is received in the buffer server to access this mail, it may be checked whether the device has been stolen.

It will be appreciated that the decoy mail method disclosed above may be implemented in a system comprising a buffer server buffering between a mobile device and a corporate server. However, it will also be appreciated that the decoy mail solution may be used in other systems and even in an ordinary mail system.

The disclosed methods and apparatus may provide a number of advantages to a user and to the corporate.

The disclosed proxy architecture is used to protect data and information, including e-mail messages, attachments, contacts, calendar items and other types of data on mobile devices communicating with a corporate server. The system may stop, filter, and otherwise manage delivery of e-mail messages, contact information, calendar items, notes, attachments and any other information from an e-mail system to end-users, based on: whether the user was able to authenticate to the server; the user credentials, IP range, geographical location, or other per-user or per-corporate status information that is stored in the server or in the corporate server, or can otherwise be retrieved from an existing source; policy of e-mail provider, organization, or individual person; content of the e-mail, contact, calendar, note, task, reminder, or any other item retrieved from the corporate messaging server; the mobile device in use; or any other criteria or a combination of any of the above.

The disclosed system and methods may eliminate or reduce the need to store information and data on the device, including corporate credentials, e-mail messages and attachments and.

The disclosed system and methods may use a buffer server to buffer the corporate servers to and from the external environment, including but not limited to mobile devices, such that the only connection of the mobile device is to the buffer server. Using the disclosed system and methods, security is enhanced by deriving from a corporate password two or more parts, and not storing all parts on any storage device.

The disclosed e-mail protection does not require any client or application to be installed on the mobile device client, except for the native applications that come with the device. It also does not depend on the mobile device itself to implement security mechanisms, except for allowing the user to respond to authentication or other requests. The end users may manage their own level of service within existing policies set for example by the e-mail provider, corporate IT or the like, without requiring administrator involvement. A user may add devices, start, stop, enable or disable the service, wipe data, or the like.

No authentication is required from the user, except when accessing secured data, e.g., no authentication is required for making a phone call, running non-secured applications, accessing non-secure information, or the like.

All sensitive data stored on the server may be encrypted with a key that is not stored on the server.

The e-mail messages and attachments are protected from being stolen, exposed, manipulated, or the like, by reducing the need to store them on the mobile device. However, if sensitive data is stored on the device, it may be encrypted with a user specific key, which is not stored locally on any storage device.

Identification data, such as corporate credentials, is also broken into several parts which may be stored on different devices, for example one part is stored on the mobile device and another on the buffer server.

Access to sensitive material is prevented or otherwise limited to a user who cannot provide a satisfactory combination of user-based authentication, device-server based authentication and optionally one or more of the following: device-based authentication and characteristics, such as device type, whether or not it is jailbroken or rooted or the like; location-based authentication and policy; network-based authentication and policy, or the like.

It will be appreciated that a dedicated security application may run on the mobile device, for example as a background service or as an independent application, and may provide another layer of security. The security application may: enable secure offline view of protected content from within the default e-mail application of the mobile device, using a proxy application that serves as a local server, for example for e-mail; enforce security policies on the device, for example preventing the use of rooted or jailbroken devices; report device security policies, or the like.

The disclosed method and apparatus may provide for managing, monitoring and controlling mobile devices connected to the corporate network and used by employees to view corporate information. The monitoring may include generating usages reports, auditing reports, dashboards, users and device management and other management capabilities.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the parts of the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implemented method performed by a buffer server, comprising:
   generating a device key and a buffer server key from a corporate server key, comprising:
      extracting a first split password and a second split password from an encrypted version of the corporate server key;
      encrypting the first split password with the second split password to produce the buffer server key; and
      encrypting the second split password to produce the device key, wherein the device key is stored on a mobile device and the buffer server key is stored on the buffer server;
   receiving, by the buffer server, a first communication request and the device key from the mobile device, wherein the buffer server comprises a processing unit and a storage device;
   verifying the device key and the buffer server key, wherein the device key and the buffer server key are related;

sending, to a corporate server, a request with details associated with the device key and the buffer server key;

receiving a response from the corporate server;

removing, by the buffer server, less than all data from the response from the corporate server before forwarding a reduced response to the mobile device, wherein the reduced response comprises only predetermined fields in accordance with a corporate policy;

receiving a user identification and a second communication request, from the mobile device, for the data that has been removed; and sending, upon verifying the user identification, the data that has been removed to the mobile device.

2. The computer-implemented method of claim 1, wherein the response or the data that has been removed from the response are displayed in a native application of the mobile device.

3. The computer-implemented method of claim 2, wherein the native application of the mobile device presents secure and non-secure items in one view.

4. The computer-implemented method of claim 1, wherein the request relates to one or more items selected from the group consisting of: an e-mail message, a calendar item, a contact, a task, a reminder, a note, and a file.

5. The computer-implemented method of claim 1, further comprising:

setting an account on the buffer server, the account associated with the mobile device;

setting a server Internet Protocol (IP) address on the mobile device to be an IP address of the buffer server.

6. The computer-implemented method of claim 1, further comprising storing the data that has been removed on the mobile device only in accordance with a policy.

7. The computer-implemented method of claim 6, wherein the policy refers to at least one item selected from the group consisting of: a user of the mobile device, type of requested information, time of request, geographic location of the mobile device, device type, data size, and data origin.

8. The computer-implemented method of claim 7, further comprising monitoring.

9. The computer-implemented method of claim 8, further comprising generating an alert if an attachment has been viewed.

10. The computer-implemented method of claim 8, wherein the method is used for enforcing regulations.

11. The computer-implemented method of claim 1, further comprising monitoring.

12. The computer-implemented method of claim 11 further comprising generating an alert if an attachment has been viewed.

13. The computer-implemented method of claim 11 wherein the method is used for enforcing regulations.

14. The computer-implemented method of claim 1, wherein communication with the mobile device uses Active-Sync over Hypertext Transfer Protocol (HTTP) or Active-Sync over secure HTTP (HTTPS).

15. The computer-implemented method of claim 1, wherein a user of the mobile device is prevented from manipulating the response when the mobile device is not communicating with the buffer server.

16. The computer-implemented method of claim 1, wherein the user identification is selected from the group consisting of: a password, a biometric characteristic of the user, proximity-based authentication, and a single-sign-on framework.

17. A system having a buffer server with a processing unit and a storage device, the buffer server comprising:

a mobile device communication component that communicates with a mobile device;

a server communication component that communicates with a server;

a password generation and manipulation component that generates a mobile device password and a buffer server password from a corporate server password, wherein the password generation and manipulation component:

extracts a first split password and a second split password from an encrypted version of the corporate server password;

encrypts the first split password with the second split password to produce the buffer server password; and encrypts the second split password to produce the mobile device password, wherein the mobile device password is stored on the mobile device and the buffer server password is stored on the buffer server;

wherein the password generation and manipulation component also receives the mobile device password to be used in conjunction with the buffer server password to authenticate the mobile device, and wherein the password generation and manipulation component also receives a user characteristic from the mobile device communicating with the buffer server and verifies a user of the mobile device, wherein the mobile device password and the buffer server password are related; and a message processing component that processes for processing requests from the mobile device before transferring to the server, and removes, less than all data from a response from the server before transferring a reduced response to the mobile device, wherein the reduced response comprises only predetermined fields in accordance with a corporate policy, wherein the reduced response is provided to the mobile device upon authentication of the mobile device, and wherein the removed data is provided to the mobile device responsive to the user of the mobile device being verified.

18. The system of claim 17, wherein the requests and responses relate to one or more items selected from the group consisting of: an e-mail message, a calendar item, a contact, a task, a reminder, a note and a file.

19. The system of claim 17, wherein the buffer server further comprises a policy enforcement component that enforces a policy related to the requests or responses.

20. The system of claim 19, wherein the policy refers to at least one item selected from the group consisting of: the user of the mobile device, type of requested information, time of request, geographic location of the mobile device, data size, and data origin.

21. The system of claim 19, wherein the mobile device comprises a native application that displays the reduced response and the removed data, and non-secure items in a unified view.

22. The system of claim 17, wherein the mobile device comprises a native application that displays data received from the server.

23. The system of claim 22, wherein the mobile device further comprises a buffer server communication component that communicates with the buffer server to receive data from the server.

24. The system of claim 22, wherein the mobile device further comprises a dedicated application that provides functionality associated with the data received.

25. The system of claim 17, wherein the server is adapted to receive communication from the mobile device only through the buffer server.

26. A non-transitory computer readable medium having executable instructions thereon, the executable instructions comprising:
- a first program instruction for generating a device key and a buffer server key from a corporate server key, comprising:
  - extracting a first split password and a second split password from an encrypted version of the corporate server key;
  - encrypting the first split password with the second split password to produce the buffer server key; and
  - encrypting the second split password to produce the device key, wherein the device key is stored on a mobile device and the buffer server key is stored on a buffer server;
- a second program instruction for receiving, by the buffer server, a first communication request and the device key from the mobile device;
- a third program instruction for verifying the device key and the buffer server key, wherein the device key and the buffer server key are related;
- a fourth program instruction for sending, to a corporate server, a request with details associated with the device key and the buffer server key;
- a fifth program instruction for receiving a response from the corporate server;
- a sixth program instruction for removing, by the buffer server, less than all data from the response from the corporate server before forwarding a reduced response to the mobile device, wherein the reduced response comprises only predetermined fields in accordance with a corporate policy;
- a seventh program instruction for receiving a user identification and a second communication request, from the mobile device, for the data that has been removed; and
- an eighth program instruction for sending, upon verifying the user identification, the data that has been removed to the mobile device.

27. The computer-implemented method of claim 1, wherein communication between the buffer server and the corporate server uses ActiveSync over hypertext transfer protocol secure (HTTPS) or a virtual private network (VPN) tunnel.

* * * * *

UNITED STATES PATENT AND TRADEMARK OFFICE
CERTIFICATE OF CORRECTION

| | |
|---|---|
| PATENT NO. | : 9,659,165 B2 |
| APPLICATION NO. | : 13/590339 |
| DATED | : May 23, 2017 |
| INVENTOR(S) | : Eran Livne |

Page 1 of 1

It is certified that error appears in the above-identified patent and that said Letters Patent is hereby corrected as shown below:

In the Claims

Column 26, Lines 30-31, (Claim 17, Lines 30-31), "a message processing component that processes for processing..." should be "a message processing component that processes..."

Signed and Sealed this
Twenty-ninth Day of August, 2017

Joseph Matal
*Performing the Functions and Duties of the*
*Under Secretary of Commerce for Intellectual Property and*
*Director of the United States Patent and Trademark Office*